Sept. 5, 1961     P. J. GOOD     2,998,842
BONDING MACHINE FOR PHOTOGRAPHIC MOUNTS
Filed July 1, 1960     4 Sheets-Sheet 1

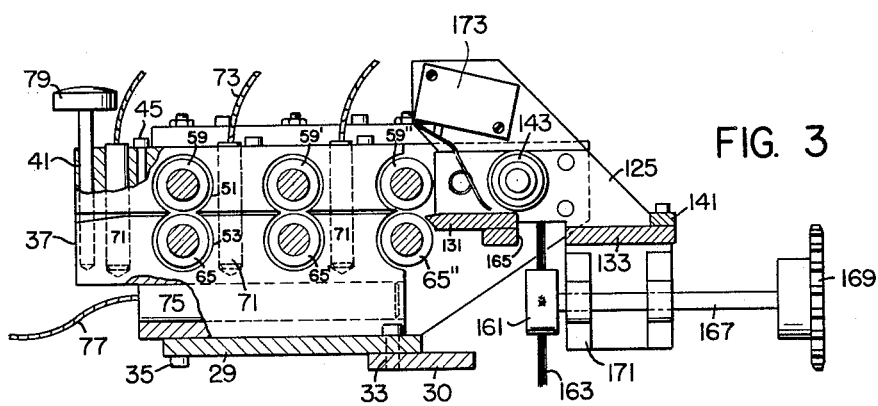
FIG. 3
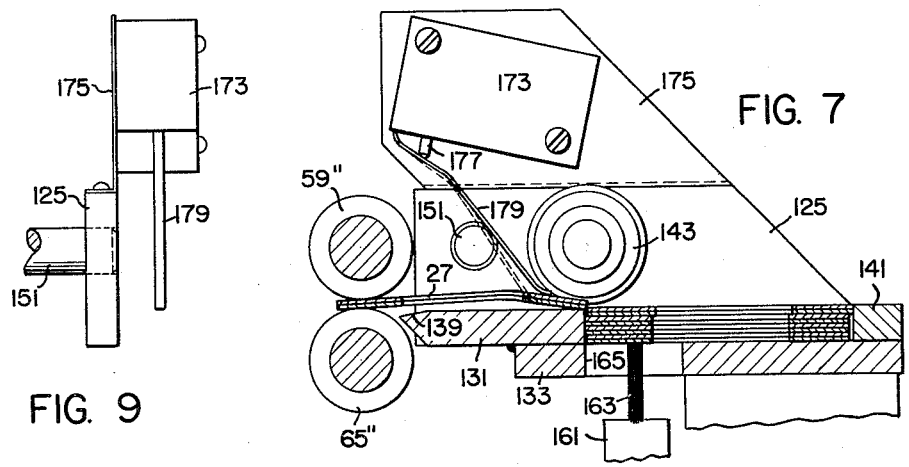
FIG. 9
FIG. 7
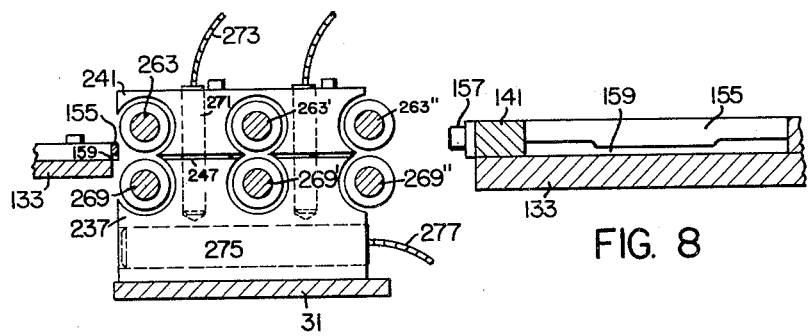
FIG. 8
FIG. 10

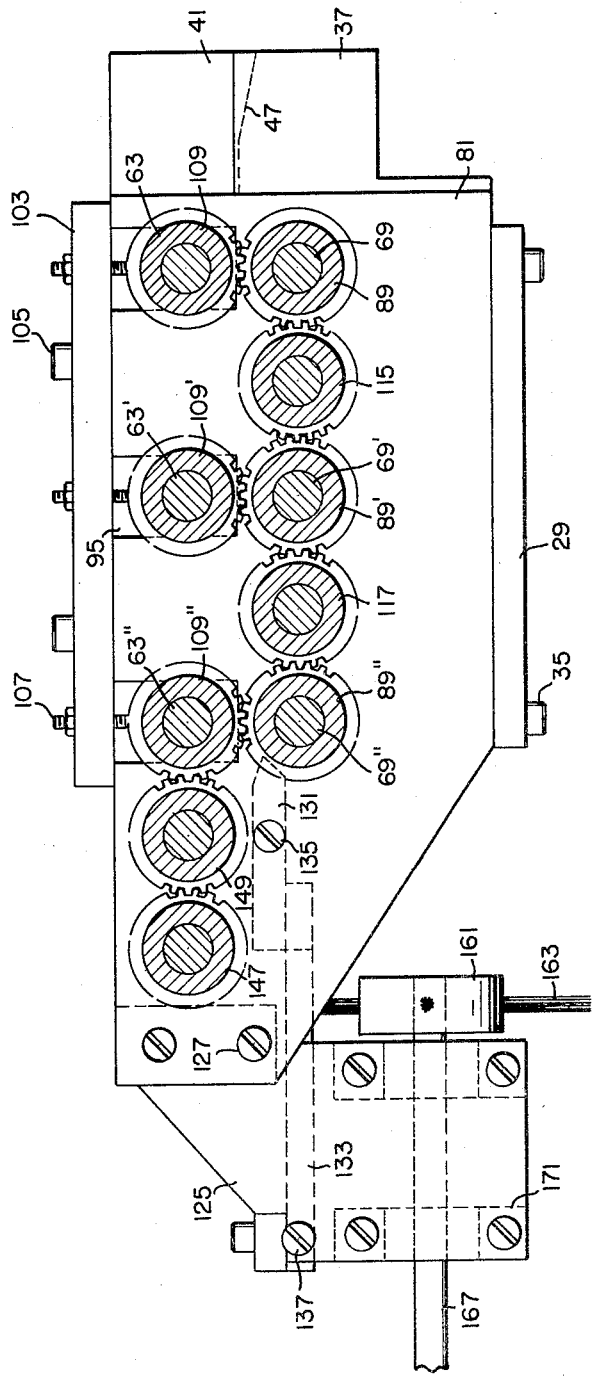

United States Patent Office 2,998,842
Patented Sept. 5, 1961

2,998,842
BONDING MACHINE FOR PHOTOGRAPHIC MOUNTS
Paul J. Good, Rochester, N.Y., assignor to Dynacolor Corporation, Rochester, N.Y., a corporation of New York
Filed July 1, 1960, Ser. No. 40,338
11 Claims. (Cl. 154—42)

The present invention relates to a bonding machine and, more particularly, to a roller bonding machine of the type used to seal double-layered mounts for photographic prints such as color slides.

An object of the invention is to provide a new and improved roller bonding machine for sealing together the overlying halves of mounts or frames for color slides, the mount halves being hinged together and provided with previously applied coatings of adhesive around their edges.

Another object is the provision of a new and improved bonding machine having rollers for hot pressing together the two layers of a photographic mount between which a suitable heat sealing type of adhesive material has been pre-applied.

Still another object is to provide a new and improved roller bonding machine for hot pressing together in sequence a plurality of double-layered frames, with provision for automatically stopping the machine when a fault arises.

A further object is the provision of a bonding machine for sealing together two overlying layers of cardboard or the like having dry coatings of heat sealing adhesive or heat sealing tape on their inner adjacent surfaces which has been applied previously.

These and other desirable objects may be attained in the manner disclosed as an illustrative embodiment of the invention in the following description and in the accompanying drawings forming a part hereof, in which:

FIG. 3 is a vertical cross section through the machine of FIG. 1 taken on the line 3—3 thereof, through the primary roller bonding unit and slide plate assembly and associated parts;

FIG. 5 is a vertical cross sectional view through the primary roller unit, taken approximately on the line 5—5 of FIG. 1;

FIG. 7 is an enlarged vertical cross sectional view of the slide plate assembly and adjacent rollers of the primary bonding unit taken approximately on the line 7—7 of FIG. 1, the microswitch being shown here as in FIG. 3;

FIG. 8 is a vertical cross section of the slide plate assembly taken on the line 8—8 of FIG. 1;

FIG. 9 is a front elevational view of the microswitch and its mounting; and

FIG. 10 is a vertical cross sectional view through the secondary roller unit and adjacent slide plate assembly taken approximately on the line 10—10 of FIG. 1.

The same reference numerals throughout the several views indicate the same parts.

Figure 2:
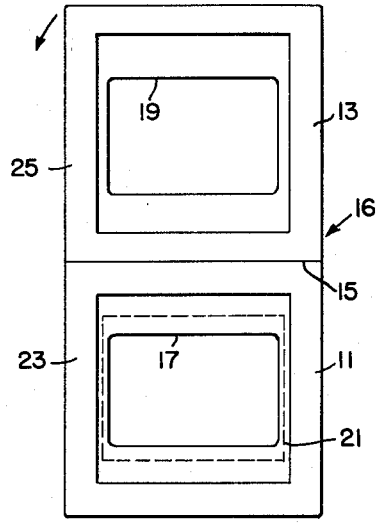
FIG. 2 is a plan view of an unfolded photographic mount for mounting a photographic print shown here is dotted lines, the mount being folded over at the center and inserted into the machine of FIG. 1 to seal together the overlying two layers at their edges.

Looking first at FIG. 2, there is illustrated an unfolded double layered photographic mount of the type to be sealed together by the bonding machine of the present invention. The photographic mount more particularly comprises a lower layer 11 and an upper layer 13 of equal size hinged together at a central fold line 15. The lower layer 11 has a central rectangular cut-out 17 and the upper layer 13 has a central cut-out 19 located so as to overlie one another when the upper layer is folded forwardly over the lower layer. A photographic transparency here indicated in dotted lines at 21 may be placed between the folded mount centered on the overlying cut-outs 17 and 19.

The two layers 11 and 13 of the photographic mount each have a coating of adhesive around their edges on the inner surfaces facing one another to hold the two layers together with the photographic print or transparency 21 between them. Thus, the lower layer 11 has a pre-applied coating of adhesive 23 around all four edges extending only part way toward the corresponding edges of the cut-out 17. In similar fashion, the upper layer 13 has a coating of adhesive 25 around all four of its edges, although it will be understood that one or the other of the adhesive coatings 23 and 25 may be omitted. The adhesive coatings 23 and 25 are pre-applied and are normally dry at the time of inserting the photographic transparency 21. The photographic mount with the upper layer 13 folded forwardly over the lower layer 11 with the photographic print 21 between is intended to be inserted into the bonding machine of the present invention to hot-press the two layers one to another or, more specifically, to adhere the adhesive coatings 23 and 25 to one another. Accordingly, the adhesive to be used is a suitable heat sealing type. The folded photographic mount will hereafter be identified by the numeral 27. According to the invention, the folded photographic mount 27 passes through a first part of the machine to simultaneously heat and press together the first pair of opposing sides of the rectangular adhesive coatings 23 and 25, and then passes through a second part of the machine to simultaneously heat and press together the other pair of opposing sides of the adhesive coatings 23 and 25.

Figure 1:
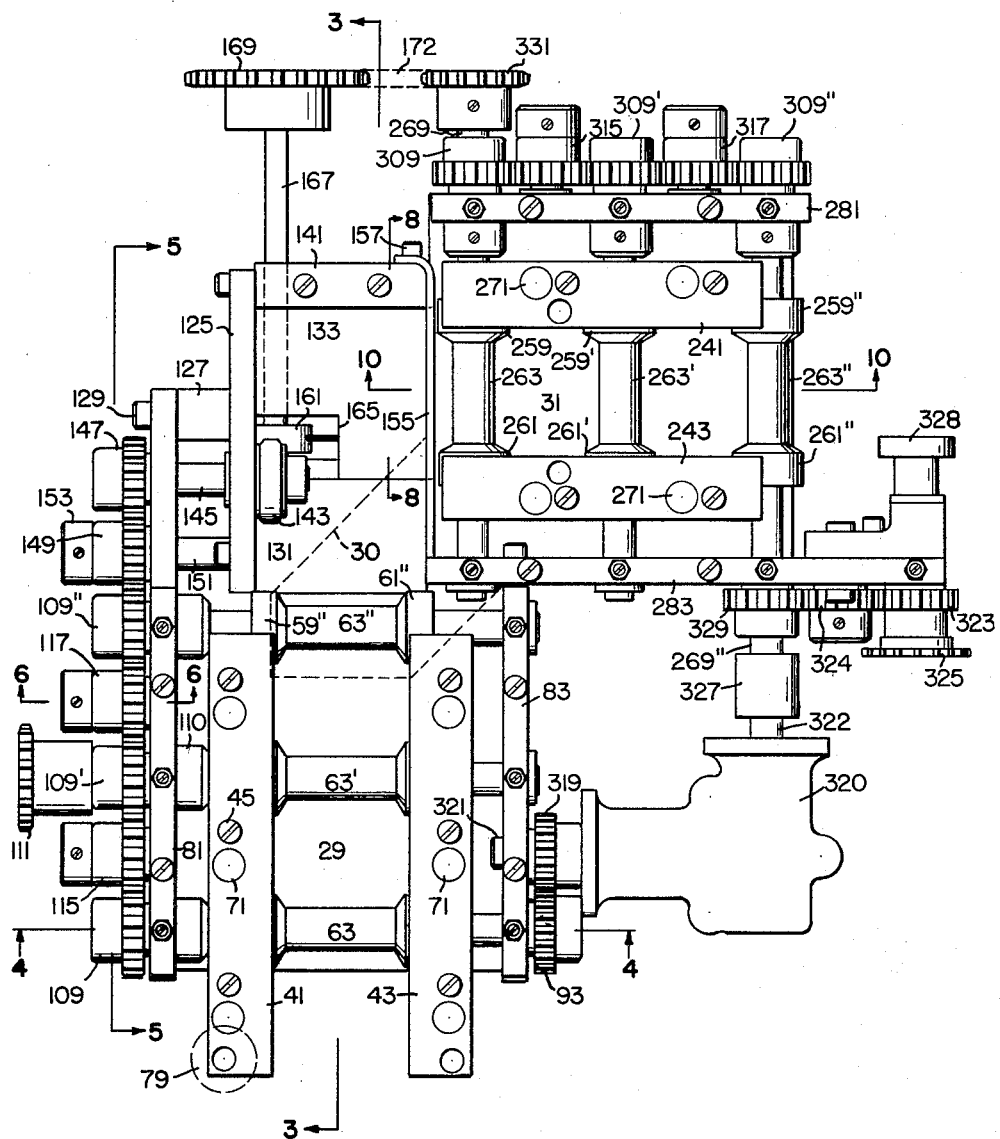
FIG. 1 is a top plan view of a bonding machine according to a preferred embodiment of the invention, a microswitch having been omitted for the sake of clarity.
Figure 4:
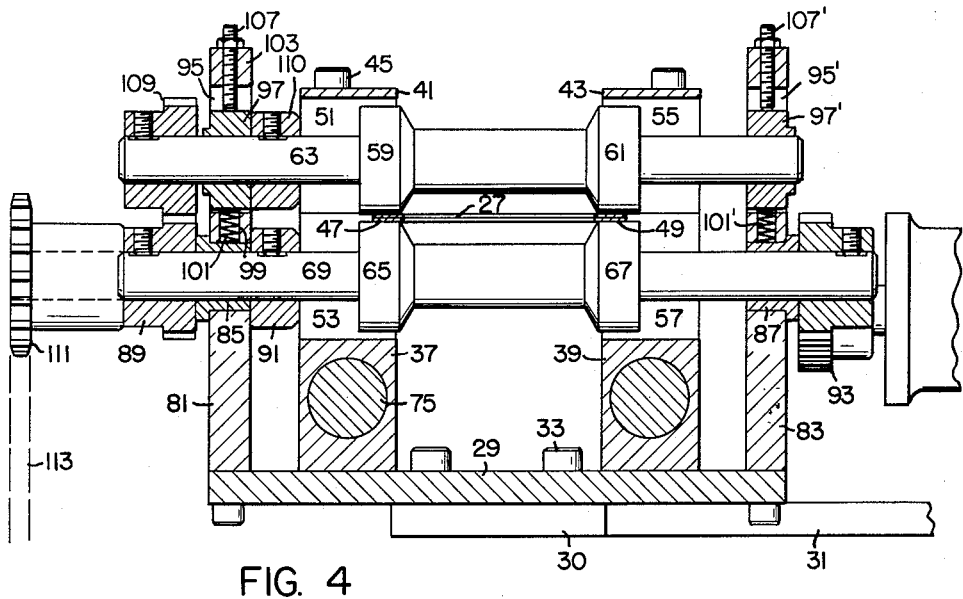
FIG. 4 is a vertical cross sectional view through one set of primary bonding unit rollers taken approximately on the line 4—4 of FIG. 1.

Referring to FIGS. 1, 3, and 4, a base plate 29 is provided for underlying the first or primary part of the machine, the rear end of the base plate 29 resting upon a connecting portion 30 of another base plate 31 which underlies the second or secondary part of the machine. The two base plates 29 and 31 are approximately rectangular and extend substantially at right angles to one another. The connecting portion 30 is integral with the base plate 31 and, as best shown in dotted lines in FIG. 1, extends from the corner nearest the base plate 29 angularly across the space between the two base plates underlying the rear end of the primary base plate 29. The base plate 29 and connecting portion 30 are appropriately secured rigidly to one another as by screw fasteners 33. The front end of the base plate 29 is held level by a pair of legs 35.

Secured to the base plate 29 extending in a front to rear direction are a pair of laterally spaced lower heater blocks 37 and 39. A pair of upper heater blocks 41 and 43 are preferably detachably secured to the tops of the heater blocks 37 and 39 in any convenient manner, such as by a plurality of elongated downwardly extending screws 45.

A horizontally disposed slot 47 is provided at the inner edges of the adjoining surfaces of the set of heater blocks 37 and 41 at one side. The slot 47 may be formed by cutting a groove or recess in the top surface of the lower heater block 37. In similar fashion, an opposing horizontally disposed slot 49 is provided between the other set of heater blocks 39 and 43, the depth of the slots 47 and 49 being such as to loosely receive the folded photographic mount 27. The lateral width between the ends of the slots 47 and 49 is likewise chosen to loosely receive the width of the folded photographic mount 27. As can be seen in FIG. 3, the front ends of the slots 47 and 49 are widened depthwise to facilitate easy entrance of the photographic mount.

The pair of heater blocks at either side is provided with a plurality of laterally extending recesses, each recess in an upper heater block adjoining its corresponding recess in the lower heater block. Thus, the upper heater block 41 has a nearly circular recess 51 adjoining a similarly shaped nearly circular recess 53 in the lower heater block 37. Referring to FIG. 4, similarly shaped and located recesses 55 and 57 are provided in the other pair of heater blocks 43 and 39 in lateral alinement with the recesses 51 and 53. The upper alined recesses 51 and 55 provide a space for a pair of laterally alined rollers 59 and 61 mounted for rotation together on a shaft 63. Preferably the rollers 59 and 61 are integral with the shaft 63, being turned down from a single piece of stock. In similar fashion, the lower pair of alined recesses 53 and 57 receive another set of laterally alined rollers 65 and 67 mounted for rotation together on a common shaft 69. The mounting of the various rollers and shafts will be described later, together with the gearing for effecting their rotation; however it will be noted that each roller is centered within its respective recess without touching any portion of the heater blocks. The rollers 59 and 65 at one side are in vertical alinement and form a cooperating pair engaging the upper and lower surfaces at one side of the photographic mount 27. In similar manner, the pair of rollers 61 and 67 at the other side cooperate upon the edge of the photographic mount 27 at the other side.

By turning the lower rollers 65 and 67 in a clockwise direction while simultaneously turning the upper pair of rollers 59 and 61 in a counterclockwise direction, it can be seen that a photographic mount 27 inserted into the slots 47 and 49 is picked up by the rollers and pressed together while moving it rearwardly through the slots. Three complete sets of rollers are provided, see FIG. 3, which are spaced from one another in a front to rear direction by a distance less than the length of the photographic mount 27, so that the leading edge of the mount 27 is picked up by the next set of rollers before each trailing edge is released by the preceding set of rollers. While good results are achieved with three complete sets of rollers, it will be understood that fewer or more sets of rollers may be provided with workable results.

The second complete set of rollers are identified by identical but primed numerals as are used for the first set of rollers, while the third complete set of rollers are identified by identical double prime numerals. The recesses in the heater blocks for receiving the second complete set of rollers are identical to the recesses previously described for the first complete set of rollers. For the third complete set of rollers, however, the recesses are a half shaped since the respective heater blocks 37 and 41 at one side and 39 and 43 at the other side are terminated midway of the rollers 59" and 65".

As described to this point, the photographic mount 27 is inserted into the slots 47 and 49 and is picked up by the first set of rollers and then by the succeeding sets of rollers to move the mount 27 to the rear end of the slots 47 and 49 while simultaneously pressing upon its upper and lower surfaces at the edges. However, it is also necessary to apply heat to the photographic mount 27, or more particularly to the adhesive coatings 23 and 25 in order to seal them together. In accordance with the invention, the pair of heater blocks 37 and 41 at one side are heated by a plurality of electrical heating units 71 inserted downwardly through alined bores in the heater blocks 37 and 41. The heating units 71 in their preferred form are preferably elongated so as to extend into the lower heater block 37, and extend out of the upper heater block 41 and are each provided with a lead 73 for connection to an external source of power. Desirably three heating units 71 are provided, one unit in advance of the first set of rollers, and the other two units between the first and second and third set of rollers. In similar fashion, three laterally alined heating units 71 are inserted into alined bores in the other set of heater blocks 39 and 43. The effect of the heating units 71, of course, is to heat up the opposing pairs of heater blocks to a desired temperature, such as between 450 degrees Fahrenheit and 500 degrees Fahrenheit. The temperature to which each pair of heater blocks is raised is regulated by a thermostat 75 inserted into a bore in the lower portion of the lower heater blocks 37 and 39 in a front to rear direction. The heating units 71 at either side are electrically connected with the lead 77 of its respective thermostat 75 to regulate the temperature between this range, or any other desired range. The temperature range chosen depends on the kind of adhesive selected, the rate of speed through the primary roller unit, and other pertinent factors. The temperature of the unit may be checked by manually pulling out a thermometer 79 located in alined bores in the front end of the heater blocks 41 and 37.

The heater blocks 37, 41, 39, and 43 are made of a material which transfers heat readily, such as aluminum. It can be seen that the edges of the blocks defining the slots 47 and 49 are heated up, and that this heat is partially transferred to the upper and lower layers 11 and 13 of the photographic mount and to the respective adhesive coatings 23 and 25. The movement of the photographic mounts 27 through the slots 47 and 49 is quite rapid, so that even though the elevated temperature of 450 degrees to 500 degrees Fahrenheit is maintained, there is no scorching or burning of the mounts. The heat is further conducted through the annular recess air spaces to the various rollers, such as rollers 59 and 65, for instance. After a pre-heating period, the rollers become quite warm, and there is an application of heat to the adhesive coatings 23 and 25 through the rollers themselves as they roll past each mount. The shafts 63 and 69, and their respective counterparts in the second and third complete set of rollers, together with the various rollers carried by the shafts, may be made of steel to which a coating of flash chrome has been applie. Thus, the edges of each photographic mount 27 are heated up as it passes through the slots 47 and 49, the adhesive coatings 23 and 25 being thereby heated and simultaneously pressed together as each mount 27 passes through the various sets of rollers.

The mounting of the shafts 63 and 69, and their counterparts in the second and third set of rollers, and the manner of rotating all of the shafts will now be described. The various shafts are carried by a pair of laterally spaced support plates 81 and 83, see FIG. 4, secured in upright position to the primary base plate 29 outwardly of the heater blocks 37 and 39. The lower shaft 69 is rotatably mounted in stationary position by being journaled at one end in a bearing 85 supported in an aperture in the support plate 81, and at the other end by a laterally alined bearing 87 supported in an aperture in the other plate 83. A drive gear 89 is fixed to the end of the shaft 69 for rotation therewith abutting against the outer end of the stationary bearing 85. The gear 89, like many of the gears to be described presently, is preferably a gear having a hub through which a setscrew extends to land against a flat spot on the shaft, whereby the gear is fixed for rotation with the shaft. The shaft 69 at the one end is secured against lateral displacement by a collar 91 appropriately fixed to the shaft, as by a setscrew, between the inner end of the bearing 85 and the lower heater block 37. There is fixed to the other end of the shaft 69 another gear 93 which bears for rotation with the shaft 69 against the outer face of the stationary bearing 87.

The upper shaft 63 is mounted for vertical adjustment in order to vary the spacing of the pair of upper and lower rollers 59 and 65, and also the pair 61 and 67, to accommodate the machine for photographic mounts 27 having different thicknesses. Referring also to FIG. 5, the support plate 81 has a cut-out or recess 95, preferably rectangular in shape, vertically above the stationary bearing 85. An adjustable bearing 97 through which the shaft 63 extends is mounted for vertical adjustment within the recess 95. To this end, the support plate 81 has a vertical bore 99 between the base of the recess 95 and the aperture in which the stationary bearing 85 is mounted. A spring 101 is disposed in the bore 99 acting against the stationary bearing at its lower end and urging the bearing 97 upwardly within the recess 95 at its other end. A top bar 103 extends across the top of the support plate 81 enclosing the recess 95, and is appropriately secured as by screw fasteners 105. To hold the adjustable bearing 97 in place within the recess 95 in opposition to the spring 101, a vertically adjustable setscrew 107 extends downwardly through a threaded bore in the top bar 103 abutting at its lower end against the bearing 97. By adjusting the depth of insertion of the screw 107 into the recess 95, the bearing 97 and the roller 59 have a corresponding vertical position.

A gear 109 is secured to the end of the shaft 63 outwardly of the bearing 97 and is in meshing engagement with the gear 89 on the shaft 69. By this arrangement, it can be seen that rotation of the gear 89, which is to be a drive gear, rotates the shaft 69 in one direction, while the shaft 63 is rotated in the opposite direction by a like amount. This end of the shaft 63 is secured against lateral displacement by a collar 110 between the bearing 97 and the upper heater block 41 fixed to the shaft by a setscrew. The mounting of the other end of the shaft 63 on the support plate 83 is identical to that described. Thus, the shaft 63 is journaled in a bearing 97' mounted for vertical adjustment in a recess 95' by tightening down a screw 107' in opposition to a spring 101' acting upwardly.

As is evident in FIG. 5, the mounting of the shafts 63' and 69' for the second set of primary rollers, and the mounting of the shafts 63" and 69" for the third set of primary rollers is identical to that described for the shafts 63 and 69 of the first set of primary rollers. Corresponding gears and elements relating to the second and third set of rollers have been given identical but primed and double primed numerals. In accordance with the invention, the drive for the various gears and shafts is transmitted through the second lower shaft 69'. For this purpose, the shaft 69' is extended outwardly by a greater distance and has secured to its end a sprocket gear 111; see FIGS. 1 and 4. A sprocket chain 113 is in driving engagement with the sprocket gear 111 and is in turn driven by an appropriate external source of power, such as a motor. Rotation of the sprocket gear 111 in a clockwise direction is thus transmitted directly to the shaft 69', and to the gears 89' and 109', to the upper shaft 63' which is rotated in the opposite counterclockwise direction at the same angular speed.

Figure 6:
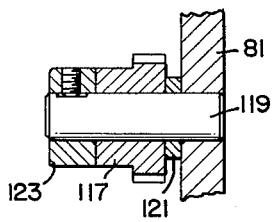
FIG. 6 is a fragmentary vertical cross sectional view taken approximately on the line 6—6 of FIG. 1.

In order to drive the shafts of the first and third set of primary rollers from the same source of power, there is an idler gear 115 between the lower drive gears 89 and 89', and another idler gear 117 between the drive gears 89' and 89". The mounting of the two idler gears 115 and 117 is identical. For instance, looking at FIG. 6, the idler gear 117 is freely rotatable on a short shaft 119 fixed at one end in the support plate 81. The gear 117 is rotatable against a washer 121 at its inner side, and is prevented from having lateral displacement at its other side by a collar 123 fixed to the end of the shaft 119, a setscrew being here shown engaging a flat spot on the end of the shaft.

With this gearing arrangement, it is apparent that driving the sprocket gear 111 by the sprocket chain 113 produces the end result of rotating the three lower shafts 69, 69', and 69" in a clockwise direction with the same angular speed, whereas the upper shafts 63, 63', and 63" are rotated in a counterclockwise direction with the same angular speed. Thus the various sets of rollers carried by the various pairs of shafts translate the photographic mount 27 along the slots 47 and 49 with approximately the same speed from one end of the slot to the other. It is assumed, of course, that the various gears which have been mentioned have the same diameter and the same number of teeth.

There is secured to the rear end of the support plate 81 a vertical mounting plate 125 (FIGS. 1 and 5). The mounting plate 125 is disposed just to the rear of the last set of rollers carried by the third shaft 63" and including the upper rollers 59" and 61". The mounting plate 125 is further spaced inwardly from the support plate 81 and for this reason is mounted on a pair of spacers 127 through each of which a screw fastener 129 extends. An upper slide plate 131 is welded to a lower slide plate 133 (see also FIG. 7), and this slide plate assembly is supported in cantilever fashion on the mounting plate 125 extending inwardly. The slide plate assembly more particularly is disposed approximately horizontally and is fixed at its side edge to the inner surface of the vertical mounting plate 125 by a pair of screw fasteners 135 and 137. The upper slide plate 131 is located at about the level of the guide slots 47 and 49 with its upper surface approximately centrally between the upper rollers 59" and 61" and the lower rollers 65" and 67" of the third set of primary rollers. The forward edge of the upper slide plate 131 is preferably pointed and tapered downwardly at 139 so that the leading edge of the plate is slightly below the lower rollers 65" and 67". In this manner, the photographic mount 27 rides rearwardly out of the third complete set of primary rollers onto the top surface of the upper slide plate 131 without binding.

The lower slide plate 133 overlaps the upper slide plate 131 by a small amount and extends rearwardly from the end of the upper slide plate by a distance greater than the length of the photographic mount 27. A stop bar 141 is secured to the top of the rear end of the lower slide 133, the distance between the rear edge of the upper slide 131 and the front edge of the stop bar 141 being approximately slightly greater than the length of the photographic mount 27. The photographic mount 27 upon leaving the third set of primary rollers slides over the upper surface of the upper slide plate 131 and drops downwardly by a distance equal to the thickness of the slide plate 131 onto the upper surface of the lower slide plate 133, rearward movement being limited by striking the stop bar 141. A rotating rubber roller is provided to turn in a counterclockwise direction to engage the photographic mount 27 during this movement to continue its rearward travel. The rubber roller 143, see FIG. 1, is fixed to a shaft 145 journaled for rotation in the mounting plate 125 and extending to the side to also be journaled in the support plate 81. A drive gear 147 is fixed to the end of the shaft 145 outwardly of the support plate 81 and is in meshing engagement with an idler gear 149. The idler gear 149 is freely rotatable on a laterally extending shaft 151 fixed at one end in the mounting plate 125 and extending through a bearing in the support plate 81, the gear 149 being held inwardly by a collar 153 fixed to the outer end of the idler shaft 151. As better seen in FIG. 5, the idler gear 149 is in meshing engagement with the gear 109" carried by the upper shaft 63" of the third set of primary rollers. By this gearing, the rubber roller 143 has counterclockwise rotation at the same angular speed as the shafts and rollers of the primary roller unit.

Referring to FIGS. 1 and 8, a stop bar 155 is secured to the inner edge of the slide plate assembly extending in a front to rear direction. The stop bar 155 in its preferred form is curved around the end of the other stop bar 141 and secured by a screw fastener 157, while the other end of the stop bar 155 is welded or the like to the side edge of the upper slide plate 131. As best seen in FIG. 8, the stop bar 155 extends above the upper surface of the lower slide plate 133 enclosing the recess or cavity into which the photographic mounts 27 fall upon sliding off of the upper slide plate 131. An elongated recess 159 is provided at the bottom edge of the stop bar 155 having a depth such that only one photographic mount 27 may pass through at a time. The ends of the slot 159 are deepened to account for a tendency of the edges of the mount 27 to curl upwardly. The device for moving the photographic mount 27 through the recess 159 will be described later.

Upon moving to the right as shown in FIG. 1 past the recess in the stop bar 155, the mount 27 next passes through another set of three secondary rollers for hot pressing and sealing the other pair of opposing sides of the mount. It will be recalled that the set of primary rollers heretofore described seals one pair of opposing sides of the photographic mount 27, whereas the secondary rollers now to be described seal the other pair of opposing sides.

The device for starting movement of each photographic mount 27 in a direction approximately at right angles to the direction of movement through the primary set of rollers and across the slide plate assembly, to move each mount 27 through the slot 159 into position to be picked up by the first of the secondary set of rollers, includes a paddle wheel 161. The paddle wheel 161 is mounted for rotation in a vertical plane and has radially extending tufts 163, preferably of bristle, at a plurality of circumferentially spaced points. The bristle tufts 163 extend upwardly through a rectangular aperture 165 in the lower slide plate 133, in position to brush against the photographic mount 27 which has come off of the upper slide plate 131 and dropped onto the lower slide plate 133. The paddle wheel 161 rotates constantly, producing the result of immediately brushing against the photographic mount 27 as it falls upon the lower slide plate 131, to urge it through the slot 159.

The paddle wheel 161 is mounted for rotation with a shaft 167 extending in a front to rear direction and projecting to the rear of the stop bar 141, the back end of the shaft having secured to it a sprocket gear 169. To mount the shaft 167, it may be noted from FIGS. 3 and 5 that the vertical mounting plate 125 has a downwardly depending leg at the sides of which are secured two vertically extending bars 171 having horizontally alined apertures in which the paddle shaft 167 is journaled. Rotation of the sprocket gear 169 by a sprocket chain 172 in a manner to be explained later, causes counterclockwise rotation of the paddle wheel 161 as viewed from the front of the machine.

The recess 159 between the stop bar 155 and the lower slide plate 133 allows only one photographic mount 27 to pass through at a time. The angular speed of the primary set of rollers is normally regulated such that there is no pileup of the mounts 27 as illustrated in FIG. 7. Should the machine get out of adjustment, however, the mounts 27 pile one above the other on the lower slide plate 133 until the combined depth is greater than that of the upper slide plate 131, that is, until the last mount 27 in the pile is above the upper surface of the plate 131. In this case, there is a jam-up, and the next mount 27 coming out of the primary set of rollers abuts against the corner of the pile of mounts 27 on the lower slide plate 133 and bulges upwardly in its central regions. A switching device is provided for automatically stopping the machine to prevent a subsequent jamming of the machine.

The switching device includes a microswitch 173 (FIGS. 3, 7, and 9) secured to the inner surface of a relatively thin upright plate 175 fastened to the top edge of the mounting plate 125. The microswitch 173 is located generally above the upper slide plate 131. A spring biased actuating arm 177 of the microswitch extends generally downwardly into contact with a long spring arm 179. The spring arm 179 is fixed to the microswitch 173 at its upper end, while its lower end is normally above the surface of the upper slide plate 131 a sufficient distance to allow the photographic mount 27 to pass underneath without striking the spring arm. However, when a jamming of the machine occurs and a photographic mount 27 is bent upwardly as shown in FIG. 7, the spring arm 179 is engaged and moves from its dotted line position to the raised full line position wherein the actuating arm 177 of the microswitch 173 is pushed inwardly, opening the microswitch. The device which drives the sprocket chain 113 engaging the sprocket 111 of the primary set of rollers is electrically connected with the microswitch 173, so that opening the microswitch causes the sprocket chain 113 to stop its rotation.

The secondary set of rollers is located to the side of the slide plate assembly in line with the recess 159 in the stop bar 155 as shown in FIG. 10. As has been mentioned, the secondary set of rollers hot presses the remaining pair of opposing sides of the photographic mounts 27, so that all four edges of the mounts 27 are sealed together. The secondary roller unit is similar in construction to the previously described primary roller unit, and corresponding elements have been given corresponding numerals but in a 200 or 300 series. Thus, the heating elements corresponding to the heating elements 71 are given the numeral 271, and the gear corresponding to the gear 109 is given the numeral 309. The secondary roller unit in its preferred embodiment has just three sets of spaced pairs of upper and lower rollers separated by a distance less than the width of the photographic mount 27. With this arrangement, as in the primary roller unit, the mount 27 is picked up by the second set of rollers before being completely released by the first set of rollers, and the same with the third set of rollers, so that the passage of each mount 27 through the secondary roller unit is automatic.

In view of its similarity to the primary unit, the construction of the secondary roller unit has not been shown completely and need not be described in as much detail. It will be understood that elements which are not discussed here are similar or identical to the corresponding elements in the other primary roller unit.

In FIG. 10, the lower heater block 237 and the upper heater block 241 have formed between them a horizontally disposed groove or slot 247 in alinement with the slot 159 in the slide plate assembly. There is, of course, another slot 249 in the other pair of heater blocks not here shown. These heater blocks are somewhat shorter than corresponding elements in the primary roller unit, since it is now necessary to have a free space in the vicinity of the front of the first set of rollers. The heater blocks 237 and 241 are furthermore heated by just two heating elements 271 extending downwardly through alined bores, while a thermostat 275 regulates the temperature. The heater blocks have recesses through which pass the various shafts and rollers. The first set of rollers are mounted on the vertically alined pair of shafts 263 and 269 while the second set of rollers are carried by the vertically alined shafts 263' and 269', and the third set of rollers are carried by the shafts 263" and 269".

The various roller shafts are journaled for rotation in a pair of laterally spaced support plates 281 and 283, the pairs of shafts being rotated in complementary directions by a gear arrangement identical to that of the primary roller unit. Power to drive the shafts and rollers of the secondary roller unit is supplied, however, from the primary roller unit.

It has previously been mentioned, see FIG. 1, that there is a gear 93 fixed to the inner end of the shaft 63 of the primary roller unit. The gear 93 meshes with another gear 319 mounted for rotation with a shaft 321 journaled at one end for rotation in a bearing in the support plate 83. The other end of the shaft 321 provides the input of an angle gear 320 having an output shaft 322 at right angles to the input shaft. It will be understood that the output shaft 322 rotates with the same angular speed as the input shaft 321. The output shaft 322 is secured to the end of the shaft 269" of the secondary roller unit by a coupling sleeve 327, whereby the various shafts of the secondary roller unit rotate with the same angular speed as the output shaft 322. A gear 329 is fixed for rotation with the outer end of the shaft 269" and is in meshing engagement with an idler gear 324 which rotates another gear 323 carried by a shaft extending through the end of the support plate 283. A sprocket gear 325 driven by the gear 323 may be used to supply power to another machine. The shaft bearing the gears 323 and 325 may be extended to the rear for mounting a drum 328 over which the mount 27 passes before collected. Although not here shown, another drum may be mounted above the drum 328 on a shaft journaled in plate 283 and rotated by a gear meshing with the gear 323, the mount 27 passing through the space between the two drums. Of course, it will be understood that the gears 325 for supplying power to other machines may be omitted as well as the drum or drums 328, as they form no part of the present invention.

The previously mentioned sprocket gear 169 conveniently derives power from the secondary roller unit for rotating the paddle 161. To this end, the lower shaft 269 is extended to the rear for mounting on it a gear 331. The sprocket chair 173 encircles this gear 331 and also the sprocket gear 169, by means of which the paddle 161 is operated.

The operation of the bonding machine will be reviewed briefly. Upon turning on the machine, the heater blocks 37 and 41 at one side of the primary roller unit are heated up by the heating elements 71, and the heater blocks 39 and 43 at the other side of the primary unit are likewise heated up by other heating elements 71. A temperature in the range of 450° F. to 500° F. is reached, and is regulated by the thermostats 75. The temperature may be checked by observing the thermometer 79. The double layered photographic mount 27 to be sealed together by the bonding machine is inserted into the front end of the horizontally alined slots 47 and 49 formed between the heater blocks at either side.

Before insertion into the machine, the photographic mount shown unfolded in FIG. 2 is prepared by inserting a photographic print, such as a color slide, disposed between the upper and lower layers 11 and 13 centered with respect to the alined cut-outs 17 and 19. The mount is supplied with a previously applied adhesive coating 23 on the outer edges, on all four sides of the bottom layer 11, and with a corresponding adhesive coating 25 on the outer edges of the other layer 13. The function of the present machine is to heat the overlying adhesive coatings 23 and 25 to a yielding point while simultaneously pressing the layers 11 and 13 together by passing them through rollers. The folded photographic mount 27 passes through a first or primary set of rollers to hot press two opposing sides of the adhesive coatings 23 and 25 together, whereafter the folded mount 27 proceeds at approximately right angles to its previous direction of motion through a second or secondary set of rollers for hot pressing together the remaining other two opposing sides of the adhesive coatings 23 and 25.

The folded photographic mounts 27 are either hand fed into the slots 47 and 49 of the primary set of rollers, or may be machine fed. The first set of rollers of the primary roller unit, including the pair of rollers 59 and 65 at one side, and the other pair of rollers 61 and 67 at the other side, are driven such that the upper rollers 59 and 61 are rotating in a counterclockwise direction, whereas the lower rollers 65 and 67 are rotating in a clockwise direction. As the folded photographic mount 27 passes through this first set of rollers, the two layers 11 and 13 are pressed together while simultaneously being traveled rearwardly within the slots 47 and 49. The rollers 59, 61, 65 and 67 are heated by conduction of heat from the heater blocks of the primary roller unit.

Thereafter the photographic mount 27 passes through a second and third set of rollers of the primary roller unit, the spacing between the first, second, and the third set of rollers being less than the length of the mount 27 so that the leading edge of the mount is picked up by the next set of rollers before the trailing edge passes completely through the previous set of rollers. The second and third sets of rollers are clearly evident in FIGS. 1 and 3.

The power for driving the various sets of rollers of the primary roller unit is derived from an external source not here shown, which drives the sprocket chain 113 (FIG. 4) engaged with the sprocket gear 111. Through the arrangement of drive gears and idler gears most clearly shown in FIG. 5, the three lower shafts 69, 69', and 69" bearing the lower rollers are driven in a clockwise direction, whereas the upper shafts 63, 63', and 63" bearing the upper rollers are driven in a counterclockwise direction. All of the shafts and rollers are rotated at the same angular speed. The upper shafts 63, 63', and 63" are adjustable in a vertical direction to separate the spacing between the various pairs of upper and lower rollers to accommodate photographic mounts 27 of different thicknesses. The adjustment is achieved by regulating the height of the ends of the adjusting screws 107, see FIG. 4, which act in opposition to the springs 101 and between which the upper shaft bearings 97 are mounted. The corresponding elements at the other end of each upper shaft are adjustable in the same manner.

Upon leaving the primary roller unit and passing rearwardly between the third set of rollers, including the rollers 59" and 65" at one side as shown in FIG. 3, the photographic mount 27 slides rearwardly across the surface of the upper slide plate 133, and is picked up and slid further to the rear by a rotating rubber roller 143. The photographic mount 27 thereafter falls into a cavity or recess resting upon the upper surface of the lower slide plate 133, rearward motion being limited by a stop bar 141.

The photographic mount 27 is now picked up for movement approximately perpendicular to the direction of motion it has had, in order to travel through a secondary roller unit for hot pressing together the other two sides of the adhesive coatings 23 and 25 on the mount 27. To this end, the rotating paddle 161 has radial brushes 163 extending upwardly through the opening 165 in the lower slide plate 133, and urges it to the right through the recess 159 between the stop bar 155 and the lower slide plate 133. In the case that there is a pile-up of mounts 27 as shown in FIG. 7, tending to jam the machine if continued, the mount 27 which catches against the leading edge of the pile tends to buckle upwardly and elevate a spring arm 179 to push inwardly on the actuating pin 177 of the microswitch 173. The microswitch 173 is connected to the source of power for the machine and is opened in this manner to stop the rotation of the rollers. The recess 159, however, in the normal operation of the machine, normally feeds only one mount 27 to the secondary roller unit at a time.

The secondary roller unit illustrated in FIG. 10 has a pair of opposing slots 247 and 249, only one of which is shown here, through which the mount 27 passes to be hot pressed at the other two opposing sides by three sets of secondary rollers while simultaneously being moved to the end of the unit in much the same manner that the primary roller unit operates.

Power for the secondary roller unit is derived from the primary roller unit through the angle gear 320, the output shaft 322 of which is coupled for rotation to drive the third shaft 269" of the secondary roller unit. By the gearing arrangement which is similar to that for the primary roller unit, all of the rollers and shafts of the secondary roller unit are rotating at the same angular speed. Power for driving the paddle wheel 161 is also derived from the secondary roller unit, through the gear 331 secured to the extended end of the lower first shaft 269, which is engaged by a sprocket chain 173 for rotating the sprocket gear 169 to which the shaft 167 bearing the paddle 161 is connected.

The bonding machine of the present invention is intended to operate at a relatively high speed. Thus, although the various heater blocks of the primary and secondary roller unit are preferably held at the elevated temperature of 450° F. to 500° F. there is no scorching or burning of the edges of the photographic mounts 27 as they pass through the machine. It is desirable to provide an automatic feeding device for feeding the folded photographic mounts 27 into the front of the machine, and to collect the finished sealed mounts 27 as they emerge from the end of the secondary roller unit. The prime advantage of the bonding machine is in its high speed automatic operation, making it suitable for use in a commercial processing laboratory. This is derived from the fact that the time cycle of bonding the adhesive does not determine the speed at which new mounts may be fed into the press, as in some prior art devices. By constructing the described machine with sufficient numbers of bonding rollers and heating stations, it could be made to accept mounts at any conceivable rate, the only requirement being that the total time of travel of the mount from acceptance to ejection from each section shall at least equal the required bonding time. Since several mounts may be traveling through the bonding machine at one time, the bonder is effectively sealing a plurality of mounts at one time.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A bonding machine for sealing the edges of a double-layered photographic mount to which coatings of adhesive have been pre-applied, said machine comprising a primary roller unit through which the mount passes to seal a pair of its opposing edges and a secondary roller unit to the rear of and substantially at right angles to said primary roller unit through which the mount passes subsequently to seal its other pair of opposing edges, said roller units each comprising a pair of parallel heater blocks between which opposing horizontally alined slots are formed, means for heating said heater blocks to a predetermined temperature range, means defining a plurality of spaced recesses in said heater blocks, a pair of opposing upper and lower rollers received in each of said recesses, the mount passing through said alined slots between said opposing pairs of rollers to simultaneously hot press the respective pairs of opposing mount edges together while moving the mount to the end of said opposing slots, means for rotating said pairs of rollers, and a slide plate assembly over which the mount moves upon being released by the primary roller unit to be fed into said secondary roller unit, said slide plate assembly including means for stopping motion of the mount in one direction and for initiating movement substantially at right angles thereto.

2. A construction as defined in claim 1, wherein said primary and secondary roller units each have at least three sets of pairs of opposing rollers each spaced from one another by respective distances less than the length and width of the mount.

3. A construction as defined in claim 1, wherein said slide plate assembly has a slot for admitting only one of the mounts at a time to said secondary roller unit.

4. A construction as defined in claim 1, further including means for stopping operation of the machine in case of jamming.

5. A bonding machine for sealing the edges of a double-layered photographic mount to which coatings of adhesive have been pre-applied, said machine comprising a primary roller unit through which the mount passes to seal a pair of its opposing edges and a secondary roller unit to the rear of and substantially at right angles to said primary roller unit through which the mount passes subsequently to seal its other pair of opposing edges, said roller units each comprising two spaced heater blocks in which horizontally alined slots are formed to receive the edges of the mount, means defining a plurality of spaced recesses in said heater blocks, a plurality of pairs of upper and lower rollers, means for mounting each of said pairs of rollers in said heater block recesses spaced therefrom to receive heat from said heater blocks by conduction, means for heating said heater blocks to a predetermined temperature range, the mounts passing through said horizontally alined slots between said pairs of upper and lower rollers to simultaneously hot press the edges of the mount together while moving the mount to the ends of said slots, means for rotating said pairs of rollers of said primary and secondary roller units, a slide plate assembly over which the mount moves upon being released by the primary roller unit to be fed into said secondary roller unit, said slide plate assembly having a stop bar for stopping motion of the mount in one direction and having a rotating wheel for initiating movement substantially at right angles thereto, said slide plate assembly also having an exit recess for delivering only one mount at a time to said secondary roller unit.

6. A construction as defined in claim 5, further including a thermostat in each of said heater blocks for regulating the temperature in the range of 450° F. to 500° F.

7. A construction as defined in claim 5, wherein said means for rotating said pairs of rollers is energized by a single source of power and is arranged to rotate all of said rollers at the same rate of speed, the upper rollers rotating in one direction and the lower rollers rotating in the opposite direction, said rotating wheel also being energized by the same source of power.

8. A construction as defined in claim 5, further including a microswitch having an actuating arm to be operated by one of the mounts to stop the machine whenever there is a jamming of the machine due to a pile up of the mounts in said slide plate assembly.

9. A bonding machine for sealing the edges of a double-layered photographic mount to which coatings of a heat sealing type of adhesive have been pre-applied, said machine comprising a primary roller unit through which the mount passes to seal a pair of its opposing edges and a secondary roller unit through which the mount passes subsequently to seal its other pair of opposing edges, said roller units each comprising a plurality of pairs of upper and lower rollers each spaced from one another, means for mounting said pairs of rollers and for rotating the upper rollers in one direction and the lower rollers in the other direction, means for guiding the mount between said pairs of rollers and for heating the mount and rollers to simultaneously hot press the opposing edges of the mount while moving the mount along, and means located between said primary and secondary roller units for orienting and transmitting the mount so that the said other pair of opposing edges thereof are introduced into said secondary roller unit.

10. A construction as defined in claim 8, wherein said primary and secondary roller units each have at least two of said pairs of rollers spaced from each other respectively less than the length and width of the mount.

11. A bonding machine for sealing the edges of a double-layered photographic mount to which coatings of a heat sealing type of adhesive have been pre-applied, said machine comprising a primary roller unit through which the mount passes to seal a pair of its opposing edges and a secondary roller unit through which the mount passes subsequently to seal its other pair of opposing edges, said roller units each comprising a plurality of pairs of upper and lower rollers each spaced from one another, means for mounting said pairs of rollers and for rotating the upper rollers in one direction and the lower rollers in the other direction, means for guiding the mount through said pairs of rollers, means for heating said pairs of rollers to simultaneously hot press the opposing edges of the mount as it moves along through the rollers, and means located between said primary and secondary roller units for orienting and transmitting the mount so that the said other pair of opposing edges thereof are introduced into said secondary roller unit.

References Cited in the file of this patent

UNITED STATES PATENTS

| | | |
|---|---|---|
| 1,841,539 | Kleinschmit | Jan. 19, 1932 |
| 2,638,147 | Nebel | May 12, 1953 |